US009673509B2

(12) United States Patent
Park et al.

(10) Patent No.: US 9,673,509 B2
(45) Date of Patent: Jun. 6, 2017

(54) ANTENNA MODULE FOR PORTABLE TERMINAL AND PORTABLE TERMINAL COMPRISING SAME

(71) Applicant: Amotech Co., Ltd., Incheon (KR)

(72) Inventors: Jongho Park, Gyeonggi-do (KR); Hyungil Baek, Gyeonggi-do (KR); Beomjin Kim, Gyeonggi-do (KR); Eulyoung Jung, Incheon (KR); Dohyung Lee, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 129 days.

(21) Appl. No.: 14/415,234

(22) PCT Filed: Jul. 17, 2013

(86) PCT No.: PCT/KR2013/006396
§ 371 (c)(1),
(2) Date: Mar. 26, 2015

(87) PCT Pub. No.: WO2014/014273
PCT Pub. Date: Jan. 23, 2014

(65) Prior Publication Data
US 2015/0207207 A1    Jul. 23, 2015

(30) Foreign Application Priority Data

Jul. 18, 2012  (KR) .................. 10-2012-0078222
Jul. 17, 2013  (KR) .................. 10-2013-0084039

(51) Int. Cl.
*H01Q 1/24* (2006.01)
*H01Q 7/00* (2006.01)
*H04B 5/00* (2006.01)

(52) U.S. Cl.
CPC ............... *H01Q 1/243* (2013.01); *H01Q 7/00* (2013.01); *H04B 5/0037* (2013.01); *H04B 5/0087* (2013.01)

(58) Field of Classification Search
CPC .......... H01Q 1/24; H01Q 1/38; H01Q 9/0421; H01Q 1/244; H01Q 1/242
(Continued)

(56) References Cited
U.S. PATENT DOCUMENTS 8,624,546 B2 *  1/2014  Jung ................. H02J 7/025
                                              320/108
2008/0211455 A1 *  9/2008  Park ................. H02J 7/025
                                              320/108
(Continued)

FOREIGN PATENT DOCUMENTS

JP    2008/210861 A    9/2008
JP    2011-072097 A    4/2011
(Continued)

*Primary Examiner* — Huedung Mancuso
(74) *Attorney, Agent, or Firm* — Wells St. John P.S.

(57) ABSTRACT

Provided are an antenna module for a portable terminal and a portable terminal including the same, wherein a slot is formed on a base sheet on which an NFC antenna and a wireless charging antenna are stacked, thereby minimizing a height difference between the NFC antenna and the wireless charging antenna. The provided antenna module for a portable terminal enables the NFC antenna and the wireless charging antenna to be stacked on an upper side of the base sheet having the slot, wherein opposite ends of the wireless charging antenna pass under a lower end of the NFC antenna while passing through the slot of the base sheet, and are connected to a power supply terminal of a portable terminal.

9 Claims, 10 Drawing Sheets

(58) Field of Classification Search
USPC .......................................... 343/702; 320/108
See application file for complete search history.

(56) References Cited

U.S. PATENT DOCUMENTS

2011/0025264 A1* 2/2011 Mochida ............. H01M 10/425
 320/108
2011/0316475 A1 12/2011 Jung et al.
2014/0084861 A1 3/2014 Jung et al.

FOREIGN PATENT DOCUMENTS

| | | |
|---|---|---|
| JP | 2011-103533 A | 5/2011 |
| JP | 2012-511892 A | 5/2012 |
| KR | 10-2006-0073819 A | 6/2006 |
| WO | WO 2010/068063 A2 | 6/2010 |
| WO | PCT/KR2013/006396 | 11/2013 |

* cited by examiner

|  | EMV Load modulation(mV) Type_A | | | | EMV Load modulation(mV) Type_B | | | |
|---|---|---|---|---|---|---|---|---|
|  | 0,0,0 | 1,0,0 | 2,0,0 | 3,0,0 | 0,0,0 | 1,0,0 | 2,0,0 | 3,0,0 |
| CHARACTERISTIC OF CONVENTIONAL NFC ANTENNA(STRUCTURE WITHOUT SLOT) | 44.83 | 33.35 | 24.36 | 17.01 | 44.84 | 33.51 | 24.5 | 16.79 |
| CHARACTERISTIC OF NFC ANTENNA OF THIS INVENTION (STRUCTURE WITH SLOT & FPCB TYPE) | 44.74 | 33.34 | 24.16 | 16.61 | 44.63 | 33.5 | 24 | 16.39 |
| CHARACTERISTIC OF NFC ANTENNA OF THIS INVENTION (STRUCTURE WITH SLOT & COIL TYPE) | 44.81 | 30.84 | 20.26 | 12.28 | 44.81 | 30.84 | 20.26 | 12.28 |

FIG. 10

ANTENNA MODULE FOR PORTABLE TERMINAL AND PORTABLE TERMINAL COMPRISING SAME

TECHNICAL FIELD

The present invention generally relates to an antenna module for a portable terminal. More particularly, the present invention relates to an antenna module for a portable terminal that includes an NFC antenna module that is built into a portable terminal to enable near field communication and a wireless charging antenna module that enables the portable terminal to be wirelessly charged, and to a portable terminal including the same.

BACKGROUND ART

With the development of technology, portable terminals, for example, PDAs, PMPs, navigation systems, and laptop computers provide DMB, wireless Internet access, near field communication functions as well as telephone communication, video/audio playback, map service functions. Therefore, a portable terminal includes a plurality of antennas for wireless communication, for example, wireless Internet access and Bluetooth communication.

Furthermore, there is a recent trend that near field communication (NFC)-based functions, such as information exchange between devices, payment, ticketing, and browsing are mounted in portable terminals. To this end, portable terminals are equipped with an antenna module (i.e. NFC antenna module) for a portable terminal that is used for near field communication. The NFC antenna module is one type of electronic tag (RFID) and is a contactless short range communication module that uses a frequency band of about 13.56 Hz and transmits data to a device at a short distance, 10 cm. The NFC is widely used in various fields, for example, transmission of production information and travel information for visitors in supermarkets or general shops, transmission of traffic information, and transmission of information in gateway control devices, as well as being used for payment for products.

NFC antenna modules are planar and mounted on battery packs or battery covers. That is, as illustrated in FIG. 1, a conventional NFC antenna module includes a shielding sheet 24 (for example, a metal plate such as a ferrite sheet) stacked on the top surface of a battery 22 of a portable terminal 10 and a radial pattern 26 stacked on the shielding sheet 24. The conventional NFC antenna module is generally mounted inside the battery pack 20 of the portable terminal 10. Alternatively, as illustrated in FIG. 2, the NFC antenna module may further include a radial patch 28 that is distanced from the radial pattern 26 and disposed inside the radial pattern 26.

In addition, recently a technology which wirelessly charges a battery of a portable terminal, without using an adaptor for charging, has become applied to portable terminals to enhance user-friendliness. That is, a wireless charging antenna is installed on a battery cover or a battery pack of a portable terminal.

In this case, as illustrated in FIG. 3, when a wireless charging antenna 40 may be installed inside an NFC antenna module 30, a power supply portion of the wireless charging antenna 40 that has a coil form is connected to a power supply terminal of the NFC antenna module 40 through solder medium. To this end, the power supply portion of the wireless charging antenna 40 is pulled out to be exposed to an outside (i.e., the power supply portion of the wireless charging antenna 40 is made to extend over or under the NFC antenna module 30 so as to be connected to the power supply terminal). In this process, a portion of the power supply portion partially overlaps the coil of an antenna portion, causing a height difference H between the NFC antenna module 30 and the wireless charging antenna 40 as illustrated in FIG. 4.

The height difference H between the NFC antenna module and the wireless charging antenna causes a problem of increasing the thickness of a component (for example, battery pack, housing of a portable terminal, etc.) in which the antenna module is mounted.

DISCLOSURE

Technical Problem

Accordingly, the present invention has been made keeping in mind the above problems occurring in the prior art, and an object of the present invention is to provide an antenna module for a portable terminal that minimizes a height difference between an NFC antenna and a wireless charging antenna by forming a slot in a base sheet on which the NFC antenna and the wireless charging antenna are stacked, and a portable terminal including the same.

Technical Solution

In order to accomplish the above object, one aspect of the present invention provides an antenna module for a portable terminal, including: a base sheet in which a slot is formed; an NFC antenna formed on an upper surface of the base sheet; and a wireless charging antenna that is formed on the upper surface of the base sheet and has an outer edge distanced from an inner edge of the NFC antenna, in which opposite ends of the wireless charging antenna pass under a lower end of the NFC antenna while passing through the slot formed in the base sheet, and the opposite ends of the wireless charging antenna are connected to a power supply terminal of the portable terminal.

The wireless charging antenna may have a loop shape that is formed by winding a wire a plurality of times, in which opposite ends of the wire may pass under the lower end of the NFC antenna while passing through the slot formed in the base sheet and the opposite ends of the wire are connected to the power supply terminal of the portable terminal.

The antenna module for a portable terminal may further include a terminal portion that has a surface on which a plurality of terminals is formed and that is connected to one side of the base sheet.

Opposite ends of the NFC antenna and the opposite ends of the wireless charging antenna are connected to the terminals formed in the terminal portion via solder media or via-hole contacts.

In order to accomplish the above object, another aspect of the present invention provides an antenna module for a portable terminal, including: a first base sheet in which a slot is formed; an NFC antenna stacked on an upper surface of the base sheet; a second base sheet disposed in the slot formed in the first base sheet; and a wireless charging antenna stacked on an upper surface of the second base sheet, in which opposite ends of the wireless charging antenna pass under a lower end of the NFC antenna while passing through the slot formed in the first base sheet and the opposite ends of the wireless charging antenna are connected to a power supply terminal of the portable terminal.

The second base sheet may be disposed in the slot of the first base sheet and distanced from the first base sheet.

The first base sheet and the second base sheet each may be formed of a shielding sheet selected from among a ferrite sheet, a polymer sheet, a nanoribbon sheet, and an iron-based sheet.

The first base sheet and the second base sheet may be shielding sheets formed of different materials.

In order to accomplish the above object, a further aspect of the present invention provides a portable terminal including: a portable terminal body; a battery pack mounted in the portable terminal body; a rear housing attached to a rear surface of the portable terminal body; and one of the antenna modules for a portable terminal according to the former aspects, the antenna module being combined with any one of the portable terminal body, the battery pack, and the rear housing.

Advantageous Effects

As described above, since the antenna module for a portable terminal according the present invention has a structure in which the wireless charging antenna extends under the NFC antenna while passing through the slot formed in the base sheet, the antenna module for a portable terminal has the following advantages: enabling the NFC antenna and the wireless charging antenna to have a uniform height; reducing a resistance of an antenna while maintaining the same performance as that of conventional FPCB-type antennas; and reducing manufacturing cost compared to conventional FPCB-type antennas.

According to the present invention, the antenna module for a portable terminal and the portable terminal including the same antenna module are structured such that the wireless charging antenna is disposed inside the NFC antenna. This structure enables an increase in size of the NFC antenna compared to conventional NFC antennas, improving the performance of an NFC antenna.

According to the present invention, the NFC antenna provided for the antenna module for a portable terminal and the portable terminal including the same antenna module is formed using a wire. Therefore, a relatively thick ferrite sheet (for example, 0.4 t or more) can be used compared to conventional FPCB-type antennas that use a ferrite sheet (0.1 t or less). Accordingly, the performance of an NFC antenna is improved.

In addition, since the antennal module for a portable terminal and the portable terminal including the same antenna module use a base sheet (i.e. ferrite sheet or nanoribbon sheet) that has a slot therein, it is possible to minimize the thickness of a portion in which the NFC antenna and the wireless charging antenna are superimposed, thereby minimizing the thickness of a component (for example, battery pack or housing) of the portable terminal in which the antenna module for a portable terminal is mounted.

DESCRIPTION OF DRAWINGS

FIG. 10 is a table showing characteristics of the antenna module for a portable terminal according to the embodiments of the present invention.

BEST MODE

Figure 1:
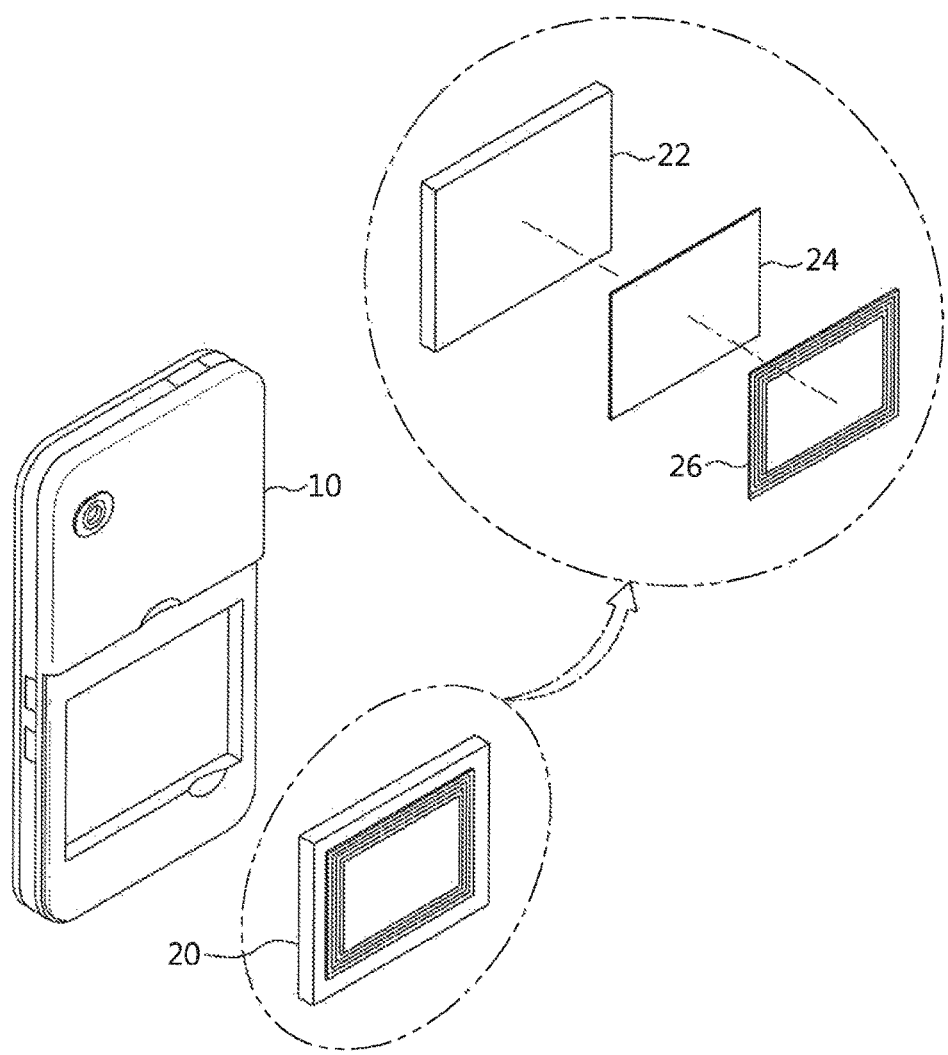
FIGS. 1 to 4 are diagrams illustrating antenna modules for a portable terminal according to conventional arts.
Figure 2:
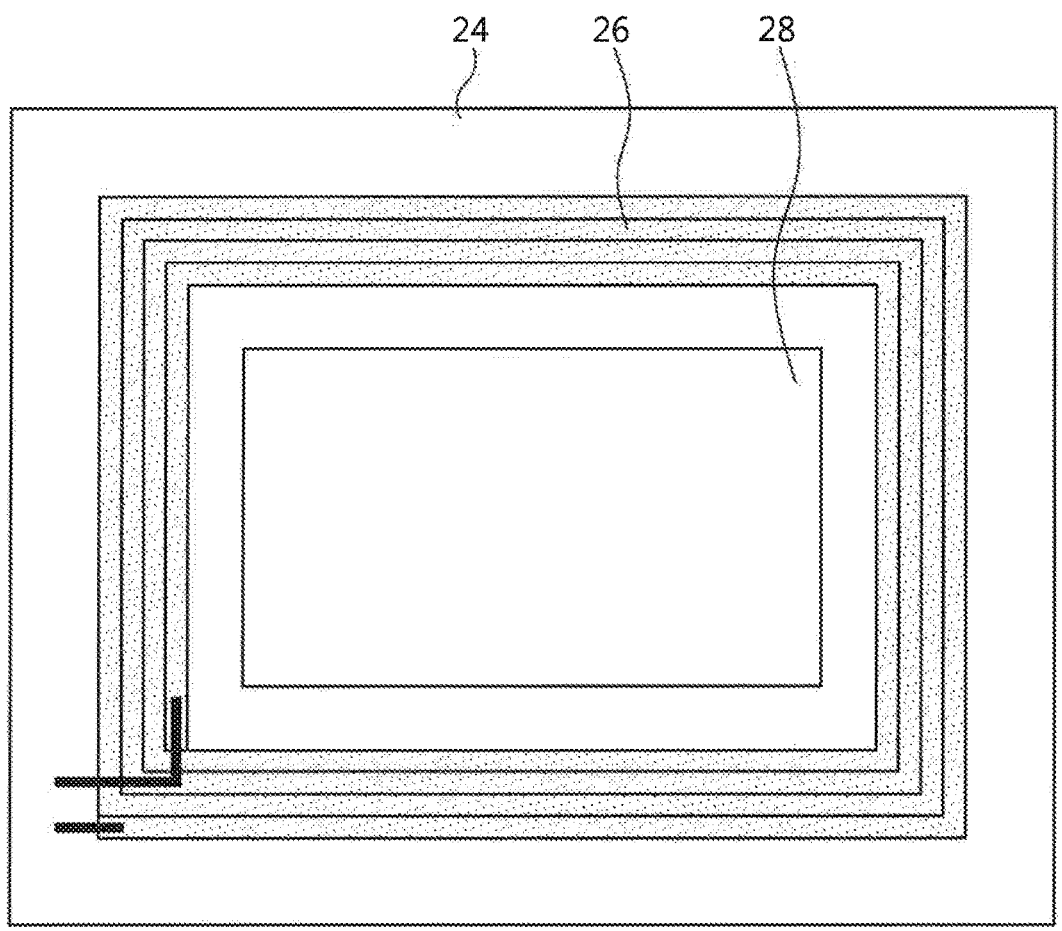
Figure 3:
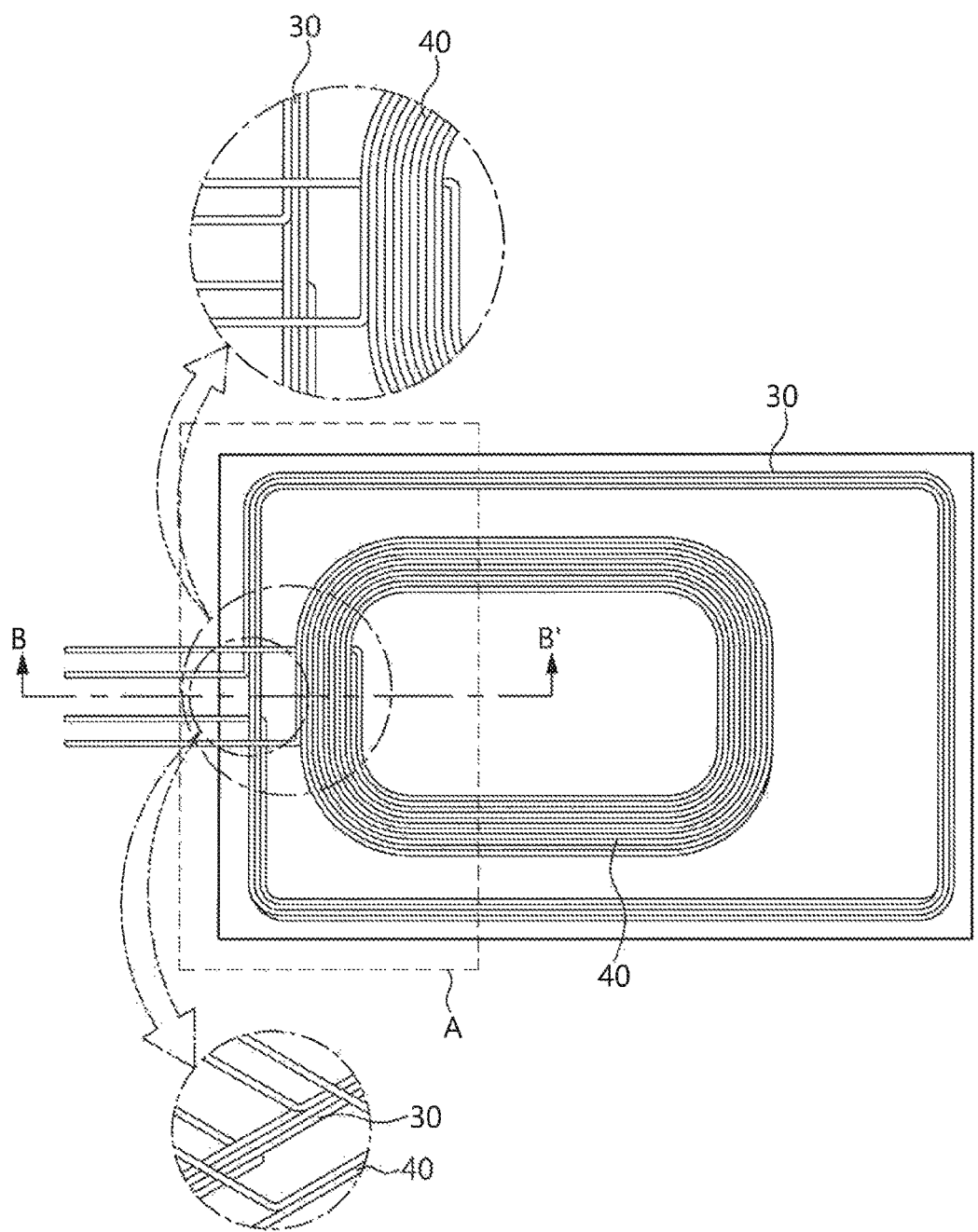
Figure 4:
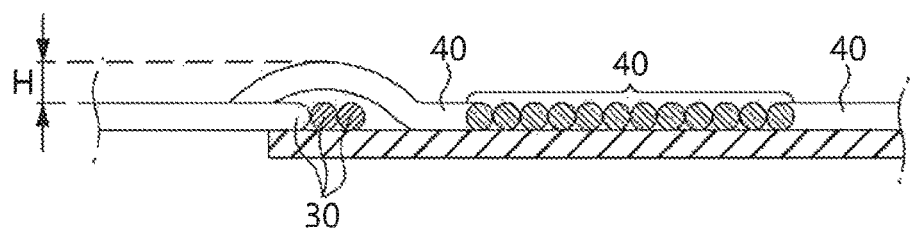

Hereinafter, a preferred embodiment of the present invention will be described with reference to the accompanying drawings to allow those skilled in the art to easily practice the present invention. The same reference numerals throughout the drawings denote elements having the same or similar function. In the following description of the present invention, detailed descriptions of known functions and components incorporated herein will be omitted when it may make the subject matter of the present invention unclear.

Figure 5:
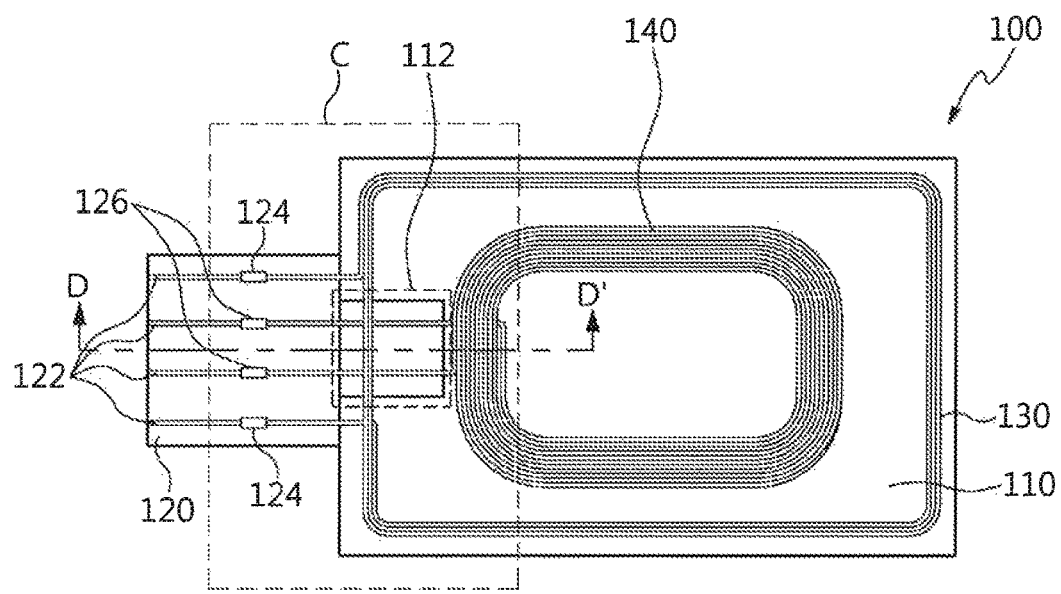
FIG. 5 is a diagram illustrating an antenna module for a portable terminal according to a first embodiment.
Figure 6:
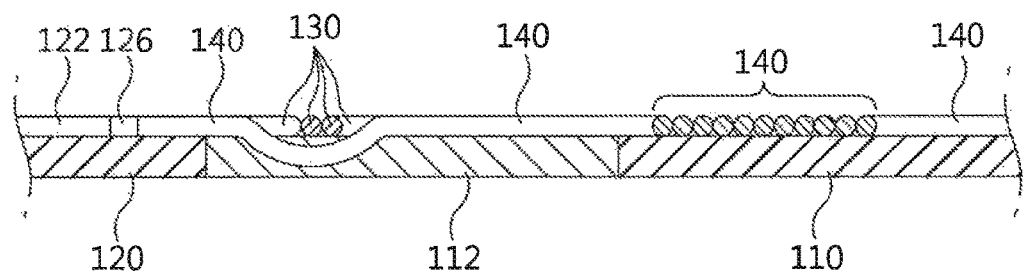
FIG. 6 is a cross-sectional view taken along line D-D' in a portion C of FIG. 5.
Figure 7:
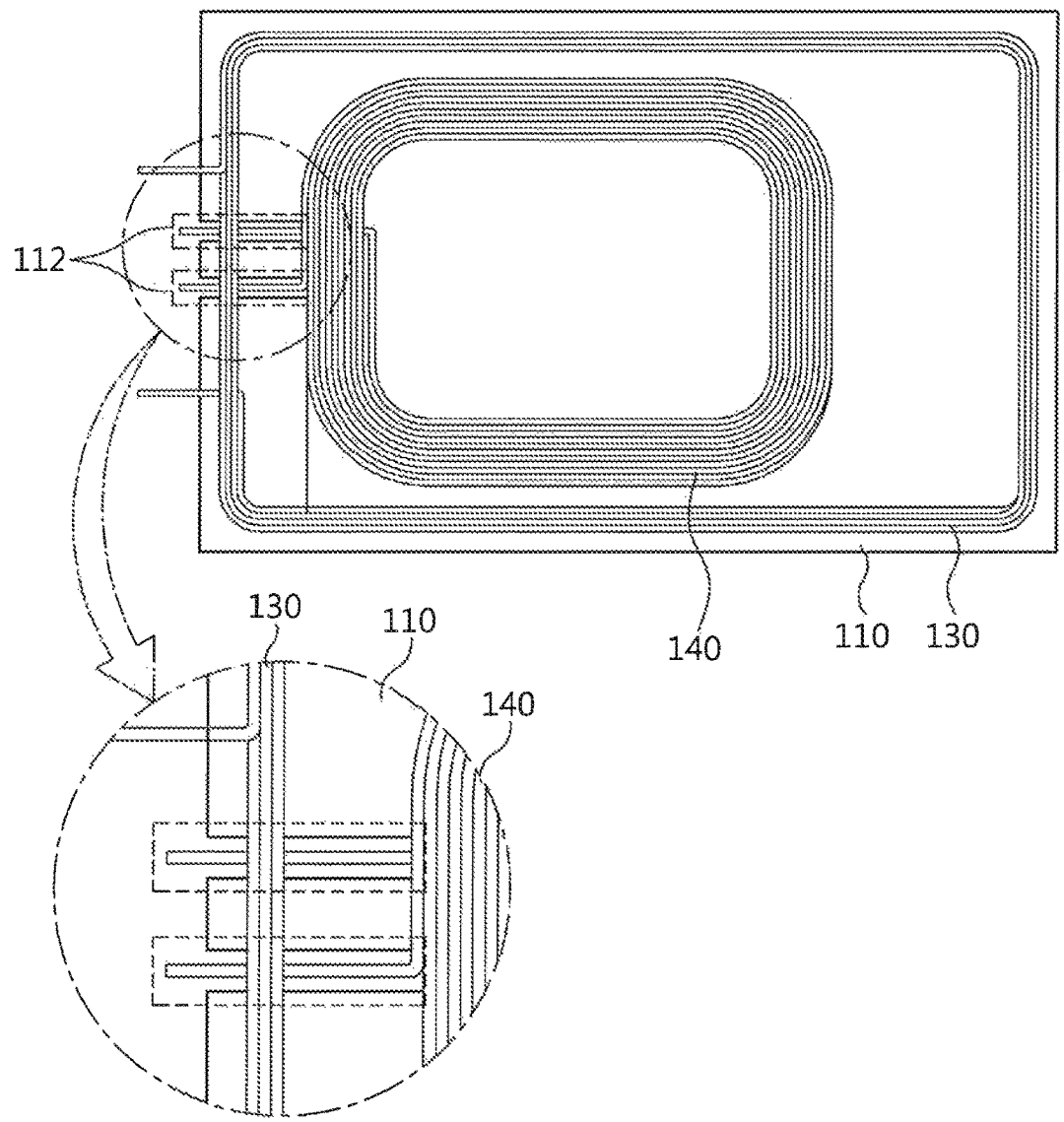
FIG. 7 is a diagram illustrating a wireless charging antenna illustrated in FIG. 5.

Hereinafter, an antenna module for a portable terminal according to a first embodiment will be described in detail with reference to the accompanying drawings. FIG. 5 is a diagram illustrating the antenna module for a portable terminal according to the first embodiment of the present invention. FIG. 6 is a cross-sectional view taken along line D-D' in a portion C of FIG. 5. FIG. 7 is a diagram illustrating a wireless charging antenna of FIG. 5.

As illustrated in FIG. 5, an antenna module 100 for a portable terminal includes a base sheet 110, a terminal portion 120, an NFC antenna 130, and a wireless charging antenna 140.

The base sheet 110 has a slot 112 and is installed on a component (for example, battery pack or housing) of a portable terminal. That is, the upper surface of the base sheet 110 is provided with the NFC antenna 130 and the wireless charging antenna 140 and the lower surface of the base sheet 110 is attached to the component of the portable terminal. The base sheet 110 serves as a shielding sheet that shields the antennas (that is, the NFC antenna 130 and the wireless charging antenna 140) and the component of the portable terminal from influence of each other. The base sheet 110 is formed of a material selected from among a ferrite sheet, a polymer sheet, a nanoribbon sheet, and an iron-based sheet.

The slot 112 is formed in the base sheet 110 to level the heights of the NFC antenna 130 and the wireless charging antenna 140. Therefore, as illustrated in FIG. 6, opposite ends of the wireless charging antenna 140 pass under a lower end of the NFC antenna 130 while passing through the slot 112, preventing a height difference between the NFC antenna 130 and the wireless charging antenna 140. Alternatively, as illustrated in FIG. 7, the base sheet 110 may have a plurality of slots 112 through which the ends of the wireless charging antenna 130 pass, respectively.

The terminal portion 120 is connected to an outer portion of the base sheet 110. In this case, a plurality of terminals 122 is formed on an upper or lower surface of the terminal portion 120. First ends of the terminals 122 are connected to a power supply terminal of the portable terminal, and second ends of the terminals 122 are connected to the opposite ends of the NFC antenna 130 or to the opposite ends of the wireless charging antenna 140 via solder media 124 and 126 (or via-hole contacts).

The NFC antenna 130 is stacked on the upper surface of the base sheet 110. The NFC antenna 130 is formed such that a fine line is printed in a loop shape on the upper surface of a flexible circuit board in which the slot 112 is formed. Alternatively, the NFC antenna 130 may be formed such that a wire is wound along a peripheral portion of the base sheet 110 and then wound inward, a plurality of times, on the upper surface of the base sheet 110. In this case the opposite ends of the NFC antenna 130 are connected to the terminals 122 formed in the terminal portion 120 via solder media 124 (or via-hole contacts).

The wireless charging antenna 140 is stacked on the upper surface of the base sheet 110. The wireless charging antenna 140 is distanced from an inner edge portion of the NFC antenna 130 having a loop shape. That is, the wireless charging antenna 140 is disposed inside the NFC antenna 130 and stacked on the upper surface of the base sheet 110.

The wireless charging antenna 140 is formed by winding a wire a plurality of times in a loop shape. In this case, opposite ends of the wire that forms the wireless charging antenna 140 pass under the NFC antenna 130 while passing through the slots 112 formed in the base sheet 110 and are then connected to the terminals 122 of the terminal portion 120. In this case, the opposite ends of the wireless charging antenna 140 are connected to the terminals 122 of the terminal portion 120 via solder media 126 (or via-hole contacts).

When the NFC antenna 130 is formed using a wire, the wireless charging antenna 140 may include an insulating member (not shown) in a portion where the wireless charging antenna 140 intersects the NFC antenna 130 so as to be electrically insulated from the NFC antenna 130. In this case, the insulating member (not shown) may be an insulating sheet or an insulating covering.

Figure 8:
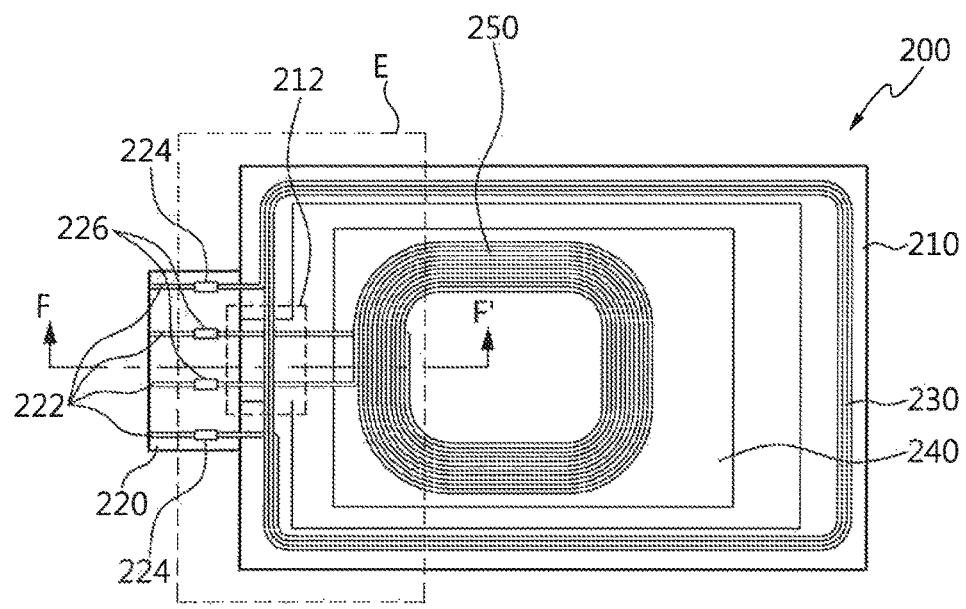
FIG. 8 is a diagram illustrating an antenna module for a portable terminal according to a second embodiment.
Figure 9:
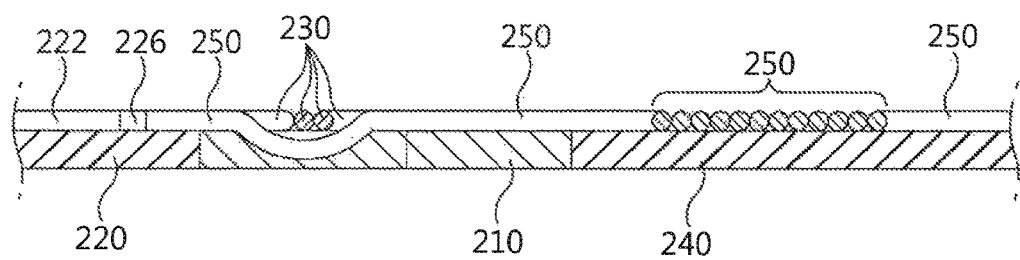
FIG. 9 is a cross-sectional view taken along line F-F' in a portion E of FIG. 8.

Hereinafter, an antenna module for a portable terminal according to a second embodiment of the present invention will be described in detail with reference to the accompanying drawings. FIG. 8 is a diagram illustrating the antenna module for a portable terminal according to the second embodiment and FIG. 9 is a cross-sectional view taken along line F-F' in a portion E of FIG. 8.

As illustrated in FIG. 8, the antenna module 200 for a portable terminal includes a first base sheet 210, a terminal portion 220, an NFC antenna 230, a second base sheet 240, and a wireless charging antenna 250. Here, the first base sheet 210 and the second base sheet 240 are formed of different materials. When the first base sheet 210 is formed of a ferrite sheet, the second base sheet 240 may be formed of a nanoribbon sheet, for example.

The first base sheet 210 has a slot 212 and is installed on a component (for example, battery pack or rear housing) of the portable terminal. That is, the NFC antenna 230 is stacked on the upper surface of the first base sheet 210 and the lower surface of the first base sheet 210 is attached to the component of the portable terminal. The first base sheet 210 serves as a shielding sheet that shields the NFC antenna 230 and the component of the portable terminal from influence of each other. The first base sheet 210 is formed of a material selected from among a ferrite sheet, a polymer sheet, a nanoribbon sheet, and an iron-based sheet.

The slot 212 is formed in the first base sheet 210 to enable the heights of the NFC antennal 230 and the wireless charging antenna 240 to be leveled. As illustrated in FIG. 9, opposite ends of the wireless charging antenna 250 pass under a lower end of the NFC antenna 230 while passing through the slot 212, thereby preventing a height difference between the NFC antenna 230 and the wireless charging antenna 250. Alternatively, the first base sheet 210 may have two slots through which the opposite ends of the wireless charging antenna 250 pass.

The terminal portion 220 is connected to an outer portion of the first base sheet 210. That is, the terminal portion 220 is connected to a first side of the first base sheet 210 that has the slot(s) 220. In this case, an upper surface or a lower surface of the terminal portion 220 is provided with a plurality of terminals 222. First ends of the terminals 222 are connected to a power supply terminal of the portable terminal, and second ends of the terminals 222 are connected to opposite ends of the NFC antenna 230 or the wireless charging antenna 250, respectively via solder media 224 and 226 (or via-hole contacts)

The NFC antenna 230 is stacked on the upper surface of the first base sheet 210. The NFC antenna 230 is structured such that a fine line is printed in a loop shape on the upper surface of a flexible circuit board. In this case, the NFC antenna 230 may be formed such that a wire is wound along a peripheral portion of the upper surface of the first base sheet 210 in a loop shape and then wound inward a plurality of times on the upper surface of the first base sheet 210. In this case, opposite ends of the NFC antenna 230 are connected to the terminals 222 of the terminal portion 220 via solder media 224 (or via-hole contacts).

The second base sheet 240 is disposed on the component (for example, battery pack or rear housing) of the portable terminal. That is, the second base sheet 240 is installed such that the wireless charging antenna 250 is stacked on the upper surface of the second base sheet 240 and the lower surface of the second base sheet 240 is attached to the component of the portable terminal. The second base sheet 240 serves as a shielding sheet that shields the wireless charging antenna 250 and the component of the portable terminal from influence of each other. Therefore, the second base sheet 240 is formed of a material selected from among a ferrite sheet, a polymer sheet, a nanoribbon sheet, and an iron-based sheet.

The second base sheet 240 is disposed inside the first base sheet 210. In this case, in order for opposite ends of the wireless charging antenna 250 stacked on the second base sheet to pass under the lower end of the NFC antenna 230, the second base sheet 240 is arranged such that a portion of the second base sheet 240 that is arranged at the same side of the terminal portion 220 of the NFC antenna 230 is distanced from the slot 212 of the first base sheet 210.

The wireless charging antenna 250 is stacked on the upper surface of the second base sheet 240. Therefore, the wireless charging antenna 250 is distanced from an inner edge of the NFC antenna 230 having a loop shape by a predetermined distance.

The wireless charging antenna 250 has a loop shape and is formed by winding a wire a plurality of times. In this case, as illustrated in FIG. 9, opposite ends of the wireless charging antenna 250 pass under the NFC antenna 230 while passing through a gap between the first base sheet 210 and the second base sheet 240 and through the slot 212 of the first base sheet 210. The opposite ends of the wireless charging antenna 250 are connected to the terminal portion 220 via solder media 226 (or via-hole contacts). When the NFC antenna 230 is formed using a wire, the wireless charging antenna 250 may include an insulating member (not shown) that electrically insulates the wireless charging antenna 250 from the NFC antenna 230 in a portion where the wireless charging antenna 250 intersects the NFC antenna 230. The insulating member (not shown) may be an insulating sheet or an insulating covering.

As described above, the antenna module for a portable terminal according to the preferred embodiments of the present invention is structured such that the wireless charging antenna extends to across the lower end of the NFC antenna while passing through the slot formed in the base sheet. Accordingly, the antenna module for a portable terminal according to the present invention has advantages of leveling the heights of the NFC antenna and the wireless charging antenna, enabling a low-resistance antenna, and reducing manufacturing cost compared to conventional FPCB-type antennas while maintaining the same performance as that of conventional FPCB-type antennas having the same size. The advantages will be more clearly understood through the following description with reference to the accompanying drawings. FIG. 10 is a table that shows performance of an NFC antenna according to a conventional art and an antenna module for a portable terminal according to the present invention both of which have the same size. With reference to FIG. 10, it is known that the antenna module for a portable terminal according to the present invention has equivalent NFC frequency characteristics to the conventional NFC antenna in terms of Type A and Type B of EMV load modulation.

Although some other characteristics are slightly deteriorated because the slot is formed in the base sheet that serves as a shielding sheet, the NFC frequency characteristic is not deteriorated. In addition, since the wireless charging antenna is disposed inside the NFC antenna in the antenna module for a portable terminal according to the present invention, the size of the NFC antenna used in the present invention can be increased compared to conventional antenna modules in which an NFC antenna and a wireless charging antenna are separately arranged side by side.

Accordingly, according to the antenna module for a portable terminal according to the present invention, a relatively large antenna can be mounted within the same mounting area. Therefore, it is possible to improve the performance of the NFC antenna compared to conventional antenna modules.

In addition, according to the antenna module for a portable terminal and the portable terminal including the same according to the present invention, the wireless charging antenna is disposed inside the NFC antenna. Therefore, the size of the NFC antenna can be increased compared to conventional NFC antennas, improving the performance of the NFC.

In addition, according to the antenna module for a portable terminal and the portable terminal including the same according to the present invention, the NFC antenna is formed using a wire. Therefore, a relatively thick ferrite sheet (for example, 0.4 t or more) can be used compared to conventional FPCB-type antennas that use a ferrite sheet (0.1 t or less).

In addition, according to the antenna module for a portable terminal and the portable terminal including the same according to the present invention, the base sheet (i.e. ferrite sheet or nanoribbon sheet) has a slot. Therefore, it is possible to minimize the thickness of a portion where the NFC antenna and the wireless charging antenna are superimposed, thereby minimizing the thickness of a component (for example, battery pack or rear housing) on which the antenna module for a portable terminal is mounted.

Figure 11:
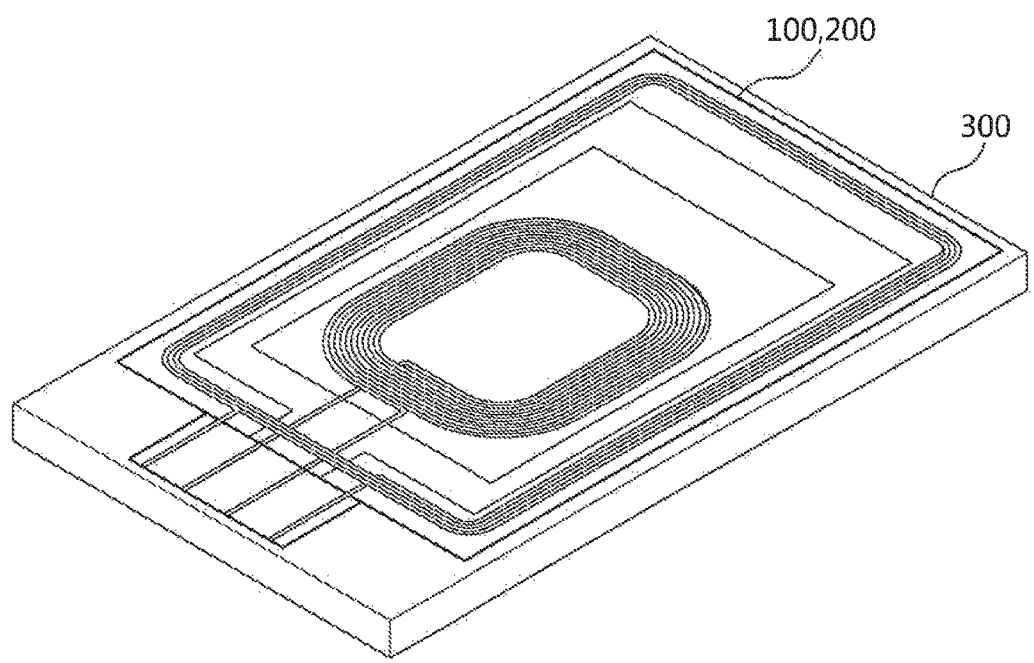
FIGS. 11 and 12 are diagrams illustrating portable terminals each including the antenna module for a portable terminal according to the embodiment of the present invention.
Figure 12:
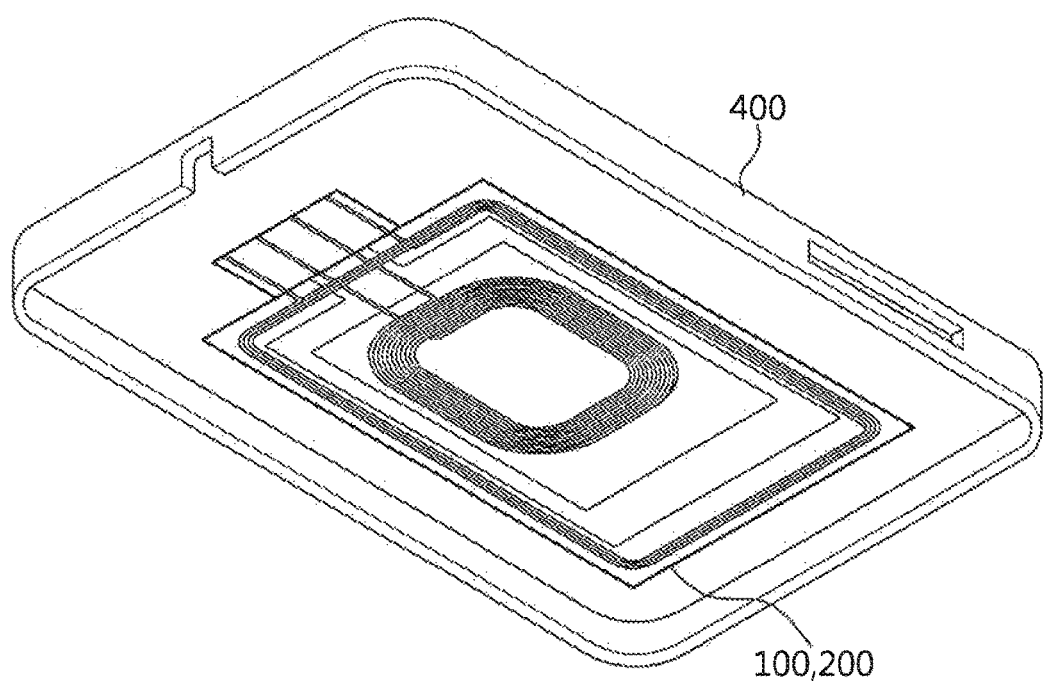

Hereinafter, a portable terminal including the antenna module according to one of the embodiments of the present invention will be described. FIGS. 11 and 12 are diagrams illustrating a portable terminal including the antenna module for the portable terminal according to one of the embodiments of the present invention.

As illustrated in FIG. 11, the portable terminal includes the antenna module 100 or 200 for a portable terminal and a battery pack 300. In this case, the antenna module 100 or 200 for a portable terminal is attached to the battery pack 300 via an adhesive (or an adhesive sheet). In this case, the antenna module 100 or 200 for a portable terminal is attached such that a surface thereof on which the NFC antenna and the wireless charging antenna are stacked faces outside. In this case, a protective sheet is stacked on a surface (the surface on which the antennas are formed) of the antenna module 100 or 200 for a portable device to prevent the antenna module 100 or 200 from breaking.

As illustrated in FIG. 12, a portable terminal includes the antenna module 100 or 200 for a portable terminal and a rear housing (i.e. battery cover) 400. In this case, the antenna module 100 or 200 for a portable terminal is attached to an inner surface of the rear housing 400 such that a surface thereof on which the NFC antenna and the wireless charging antenna are stacked faces outside. The antenna module 100 or 200 for a portable terminal is attached to the inner surface of the rear housing 400 via an adhesive (or an adhesive sheet). Alternatively the antenna module 100 or 200 for a portable terminal may be attached to the inner surface of the rear housing 400 via an adhesive sheet or a protective sheet arranged on the other surface thereof instead of the adhesive.

Alternatively, the portable terminal may include the antenna module 100 or 200 for a portable terminal that is embedded in the rear housing 400.

Although preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. An antenna module for a portable terminal, comprising:
a base sheet in which a slot is formed;
an NFC antenna formed on an upper surface of the base sheet;
a wireless charging antenna that is formed on the upper surface of the base sheet and has an outer edge distanced from an inner edge of the NFC antenna, wherein opposite ends of the wireless charging antenna pass under the NFC antenna while passing through the slot formed in the base sheet and are connected to a power supply terminal of the portable terminal; and
an insulating sheet formed in a portion where the wireless charging antenna intersects the NFC antenna to provide an insulation between the wireless charging antenna and the NFC antenna.

2. The antenna module for a portable terminal according to claim 1, wherein:
the wireless charging antenna has a loop shape that is created by winding a wire a plurality of times, wherein opposite ends of the wire pass under the NFC antenna while passing through the slot formed in the base sheet and are connected to the power supply terminal of the portable terminal.

3. The antenna module for a portable terminal according to claim 1, further comprising:
a terminal portion that has a surface on which a plurality of terminals is formed and that is connected to one side of the base sheet.

4. The antenna module for a portable terminal according to claim 3, wherein opposite ends of the NFC antenna and the opposite ends of the wireless charging antenna are connected to the terminals formed in the terminal portion via solder media or via-hole contacts.

5. An antenna module for a portable terminal, comprising:

a first base sheet in which a slot is formed;

an NFC antenna stacked on an upper surface of the base sheet;

a second base sheet disposed in the slot formed in the first base sheet;

a wireless charging antenna stacked on an upper surface of the second base sheet, wherein opposite ends of the wireless charging antenna pass under the NFC antenna while passing through the slot formed in the first base sheet and are connected to a power supply terminal of the portable terminal; and an insulating sheet formed in a portion where the wireless charging antenna intersects the NFC antenna to provide an insulation between the wireless charging antenna and the NFC antenna.

6. The antenna module for a portable terminal according to claim 5, wherein the second base sheet is disposed in the slot of the first base sheet and distanced from the first base sheet.

7. The antenna module for a portable terminal according to claim 5, wherein the first base sheet and the second base sheet each are formed of a shielding sheet selected from among a ferrite sheet, a polymer sheet, a nanoribbon sheet, and an iron-based sheet.

8. The antenna module for a portable terminal according to claim 7, wherein the first base sheet and the second base sheet are shielding sheets formed of different materials.

9. A portable terminal comprising:

a portable terminal body;

a battery pack mounted inside the portable terminal body;

a rear housing attached to a rear surface of the portable terminal body; and an antenna module for a portable terminal according to claim 1, the antenna module being combined with any one of the portabie terminal body, the battery pack, and the rear housing.

* * * * *